United States Patent
Weinenger et al.

(10) Patent No.: US 10,082,102 B2
(45) Date of Patent: Sep. 25, 2018

(54) PISTON AND METHOD OF MAKING A PISTON

(71) Applicant: Federal-Mogul Corporation, Southfield, MI (US)

(72) Inventors: Michael Weinenger, Southfield, MI (US); Florin Muscas, Novi, MI (US)

(73) Assignee: Federal-Mogul LLC, Southfield, MI (US)

( * ) Notice: Subject to any disclaimer, the term of this patent is extended or adjusted under 35 U.S.C. 154(b) by 617 days.

(21) Appl. No.: 14/159,729

(22) Filed: Jan. 21, 2014

(65) Prior Publication Data
US 2014/0202404 A1    Jul. 24, 2014

Related U.S. Application Data

(60) Provisional application No. 61/754,668, filed on Jan. 21, 2013.

(51) Int. Cl.
| | |
|---|---|
| *F02F 3/28* | (2006.01) |
| *B23K 20/12* | (2006.01) |
| *F16J 1/22* | (2006.01) |
| *F02F 3/22* | (2006.01) |
| *F02F 3/26* | (2006.01) |
| *F02F 3/00* | (2006.01) |

(52) U.S. Cl.
CPC .............. *F02F 3/28* (2013.01); *B23K 20/129* (2013.01); *F16J 1/22* (2013.01); *F02F 3/22* (2013.01); *F02F 3/26* (2013.01); *F02F 2003/0061* (2013.01); *Y10T 29/49252* (2015.01)

(58) Field of Classification Search
CPC .............. F02F 2003/0061; F02F 3/003; B23K 2201/003

USPC ........ 123/193.6, 193.1; 29/888.044; 219/635, 219/639

See application file for complete search history.

(56) References Cited

U.S. PATENT DOCUMENTS

| | | |
|---|---|---|
| 1,409,954 A | 3/1922 | Johnston |
| 1,500,010 A | 7/1924 | Smith et al. |
| 2,818,314 A | 12/1957 | Nicholas |

(Continued)

FOREIGN PATENT DOCUMENTS

| | | |
|---|---|---|
| CN | 102667124 A | 9/2012 |
| CN | 102844556 A | 12/2012 |

(Continued)

OTHER PUBLICATIONS

International Search Report dated Apr. 4, 2014 (PCT/US2014/012271).

*Primary Examiner* — Long T Tran
(74) *Attorney, Agent, or Firm* — Robert L. Stearns; Dickinson Wright, PLLC

(57) ABSTRACT

A monobloc piston assembly for an internal combustion engine is provided. The piston assembly includes a piston body which extends along an axis and is formed of at least two pieces of material which are joined together at least one friction weld joint which extends continuously through an annular shape around the axis. One of the pieces has an upper surface with a combustion bowl having a rotationally asymmetrical shape around the axis formed therein. Another of the pieces has a dome-shaped receiving surface which is rotationally symmetrical around the axis for slidingly receiving a portion of a connecting rod.

19 Claims, 10 Drawing Sheets

(56) References Cited

U.S. PATENT DOCUMENTS

| | | | |
|---|---|---|---|
| 3,365,979 A | 1/1968 | Ericson | |
| 4,635,596 A * | 1/1987 | Nakano | F16J 1/14 123/193.6 |
| 4,662,319 A | 5/1987 | Ayoul | |
| 5,762,038 A * | 6/1998 | Mielke | F02B 23/0696 123/193.6 |
| 6,588,320 B2 * | 7/2003 | Gaiser | B23P 15/10 92/231 |
| 6,651,549 B2 * | 11/2003 | Zhu | F02F 3/003 92/186 |
| 7,005,620 B2 * | 2/2006 | Ribeiro | F02F 3/003 219/635 |
| 7,086,368 B2 | 8/2006 | Endoh et al. | |
| 7,127,981 B2 | 10/2006 | Endoh et al. | |
| 7,367,305 B2 | 5/2008 | Endoh et al. | |
| 7,451,737 B2 | 11/2008 | Songen | |
| 8,631,573 B2 * | 1/2014 | Scharp | B23P 15/10 123/193.6 |
| 2003/0037671 A1 * | 2/2003 | Zhu | F02F 3/00 92/231 |
| 2004/0149739 A1 * | 8/2004 | Ribeiro | F02F 3/003 219/635 |
| 2005/0092739 A1 * | 5/2005 | Ribeiro | F02F 3/003 219/635 |
| 2006/0207424 A1 * | 9/2006 | Gaiser | F02F 3/003 92/222 |
| 2009/0037671 A1 * | 2/2009 | Bower | H04L 49/90 711/154 |
| 2009/0044697 A1 * | 2/2009 | Azevedo | F16J 1/04 92/159 |
| 2010/0218673 A1 * | 9/2010 | Ribeiro | F02F 3/003 92/181 R |
| 2011/0107997 A1 * | 5/2011 | Muscas | F02F 3/003 123/193.6 |
| 2011/0119914 A1 | 5/2011 | Janssen et al. | |
| 2012/0037112 A1 * | 2/2012 | Muscas | F02F 3/003 123/193.6 |
| 2012/0222304 A1 | 9/2012 | Scharp et al. | |
| 2012/0260882 A1 * | 10/2012 | Martins | B23B 1/00 123/193.6 |
| 2013/0000590 A1 | 1/2013 | Keller | |

FOREIGN PATENT DOCUMENTS

| | | |
|---|---|---|
| DE | 102008011922 A1 | 9/2009 |
| FR | 1083390 A | 1/1955 |
| JP | S47022255 Y1 | 7/1972 |
| JP | S5881266 A | 5/1983 |
| JP | H04211763 A | 8/1992 |
| JP | H09144879 A | 6/1997 |
| JP | 2000213646 A | 8/2000 |
| JP | 2010247236 A | 11/2010 |

\* cited by examiner

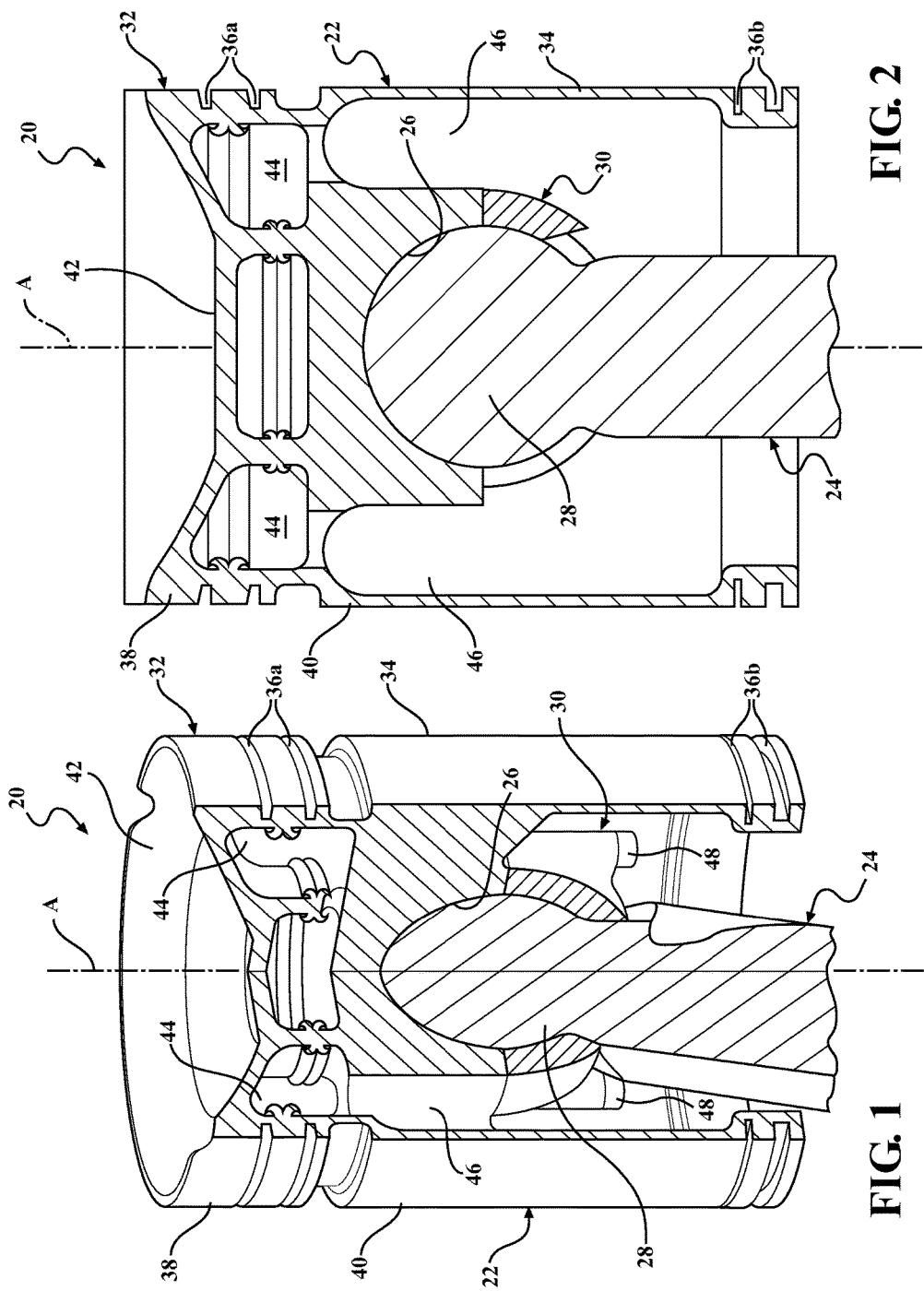

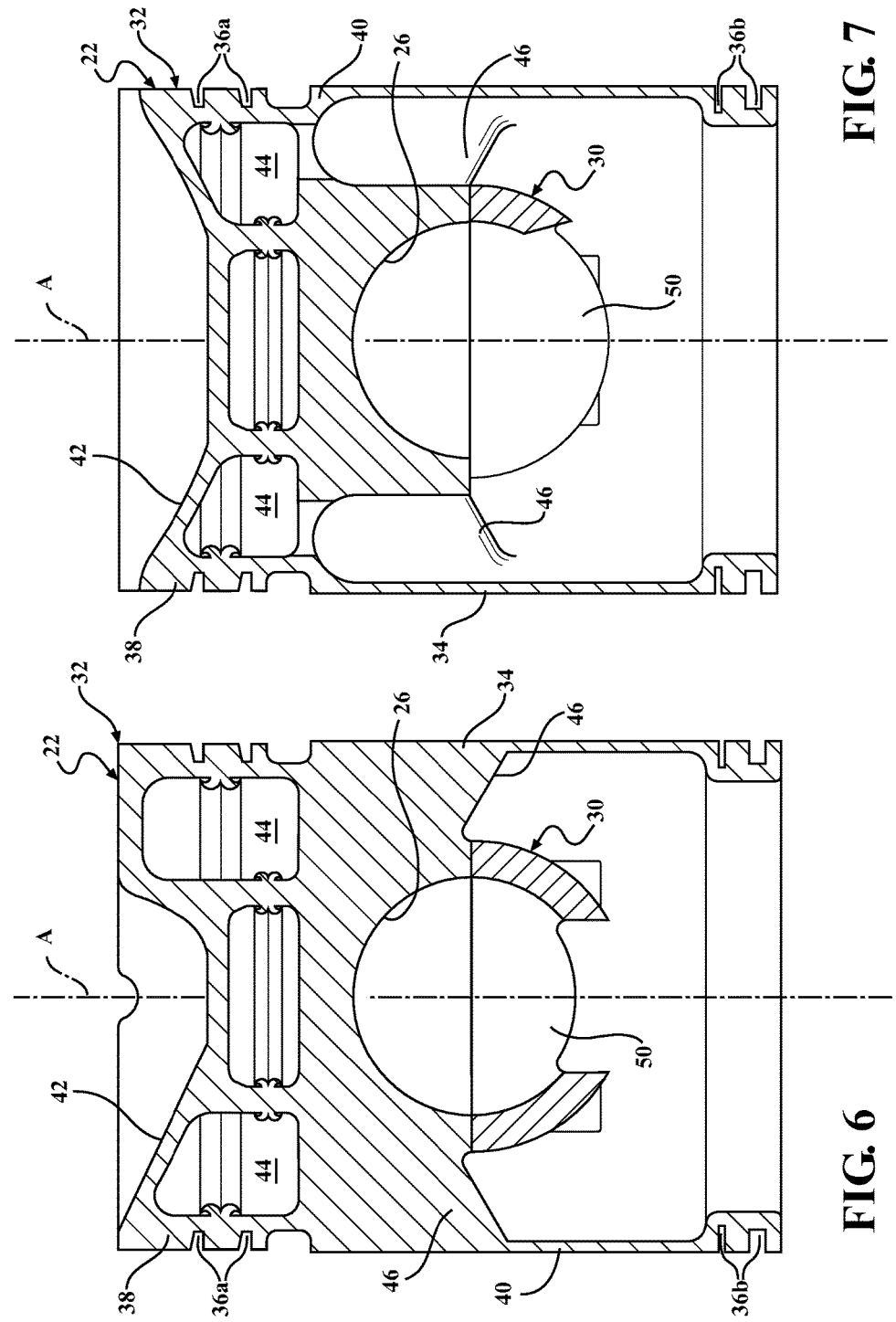

PISTON AND METHOD OF MAKING A PISTON

CROSS-REFERENCE TO RELATED APPLICATION

This application claims the benefit of application Ser. No. 61/754,668, filed Jan. 21, 2013, the disclosure of which is incorporated herein by reference.

BACKGROUND OF THE INVENTION

1. Field of the Invention

The present invention is related generally to pistons for internal combustion engines.

2. Related Art

In a continuing effort to improve the power production and fuel efficiency of internal combustion engines, the designs of monobloc, or one-piece, piston bodies for internal combustion engines have become increasingly complex to accommodate such features as cooling galleries and uniquely shaped combustion bowls. Often, it is not cost effective to form such complex piston designs from a single unitary piece of material. Therefore, many piston manufacturers form piston bodies of two or more components and subsequently join those components together. For example, some monobloc piston designs include a first piece which includes a crown portion and a second piece which includes opposing skirt portions and opposing pin bores for receiving a wrist pin. The first and second pieces may then be joined together through a range of different joining processes including, for example, various types of welding, bolts, fasteners, etc.

One particularly cost effective approach for joining together the first and second pieces of a monobloc piston body is to friction weld those two pieces together by rotating one piece relative to the other at a high rate of speed and bringing the pieces into contact with one another such that heat from friction between the two pieces causes the material at the juncture to heat to a plastic state. The high pressure of the materials at the juncture has the effect of bonding the pieces together. Subsequent cooling of this melted material has been found to create a particularly strong weld joint between the first and second pieces of the monobloc piston body. However, one issue with this approach is it is very difficult to precisely rotationally align the first and second pieces with respect to one another during friction welding. As such, in general, friction welding is only practical where one (or both) of the first and second pieces is rotationally symmetrical such that its rotational alignment relative to the other piece does not affect the shape of the piston body. Since wrist pin bores, by their very nature, cannot be rotationally symmetrical, piston manufacturers typically overcome this limitation of friction welding by only using friction welding to join the pieces of piston bodies which have rotationally symmetrical combustion bowls.

SUMMARY OF THE INVENTION

One aspect of the present invention is an improved monobloc piston assembly for an internal combustion engine. The piston assembly includes a piston body which extends along an axis and is formed of at least two pieces of material that are joined together at least one weld joint which extends continuously through an annular shape around the axis. One of the pieces has an upper surface with a combustion bowl formed therein, and the combustion bowl has a rotationally asymmetrical shape around the axis. Another of the pieces has a dome-shaped receiving surface for slidingly receiving a portion of a connecting rod, and the dome-shaped receiving portion is rotationally symmetrical about the axis.

The improved piston assembly is advantageous because the rotationally symmetrical dome-shaped receiving surface allows the combustion bowl to be formed with a rotationally asymmetrical shape without compromising the ability of the pieces to be joined together through a range of different types of operations. As such, in addition to allowing for improved performance, the piston assembly may be manufactured cost effectively.

According to another aspect of the present invention, the weld joint is a friction weld joint.

Another aspect of the present invention provides for a method of making a piston. The method includes the step of preparing a first piece of a piston body, the first piece having a combustion bowl formed in an upper surface thereof and wherein the combustion bowl has a rotationally asymmetrical shape about an axis. The method proceeds with the step of preparing a second piece of the piston body, the second piece having a dome-shape receiving surface with a rotationally symmetrical shape about the axis for receiving an end of a connecting rod. The method continues with the step of friction welding the first and second pieces of the piston body together.

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 1 is a sectional view of an exemplary embodiment of a piston and connecting rod assembly;

FIG. 2 is a cross-sectional view of the piston and connecting rod assembly of FIG. 1;

FIG. 6 is a cross-sectional view showing a cap in engagement with the piston body;

FIG. 7 is another cross-sectional view of the cap in engagement with the piston body taken from a different location than the cross-sectional view of FIG. 6;

DESCRIPTION OF THE ENABLING EMBODIMENT

Figures 3, 4:
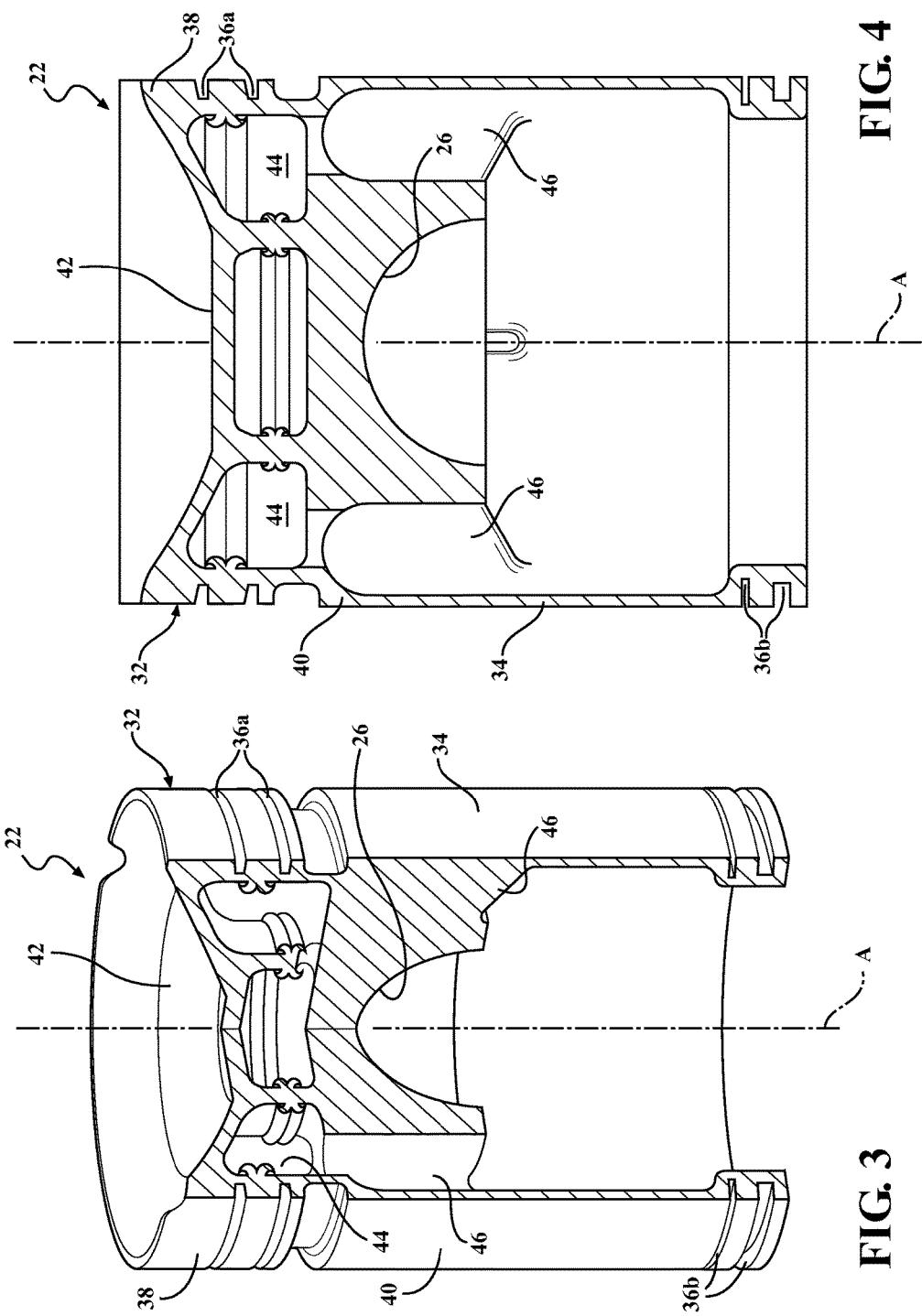
FIG. 3 is a sectional view of the piston body of the assembly of FIG. 1.
FIG. 4 is a cross-sectional view of the piston body.
Figure 5:
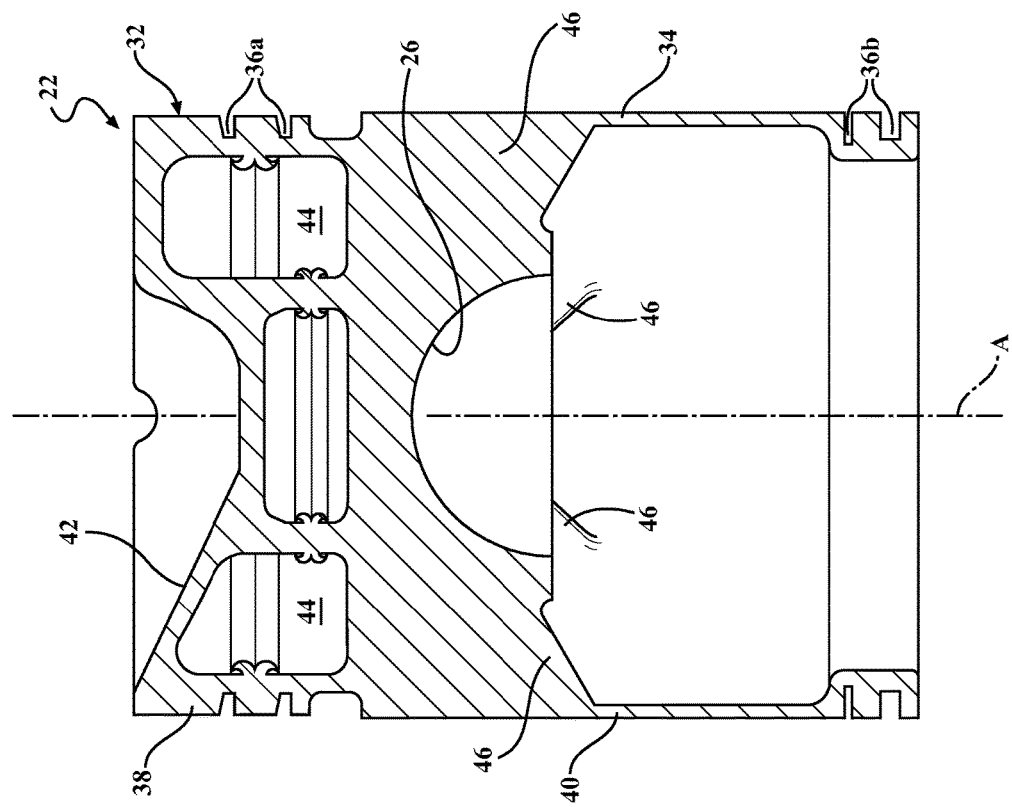
FIG. 5 is another cross-sectional view of the piston body taken from a different location than the cross-sectional view of FIG. 4.
Figure 8:
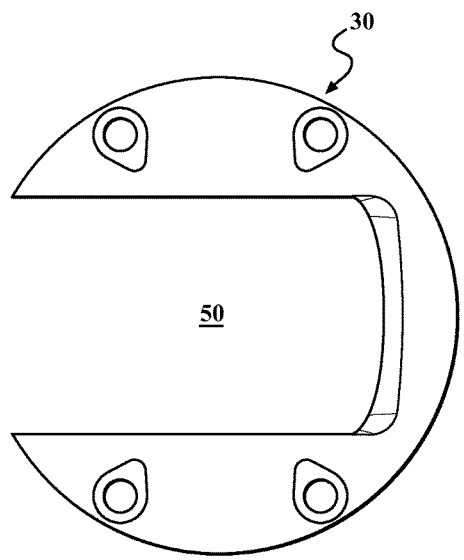
FIG. 8 is a bottom elevation view of the cap.
Figure 9:
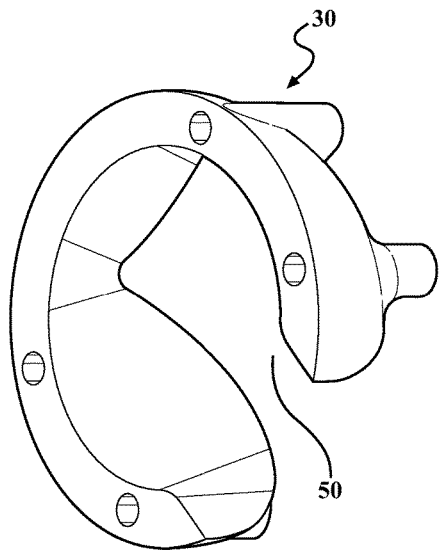
FIG. 9 is a perspective elevation view of the cap.
Figure 10:
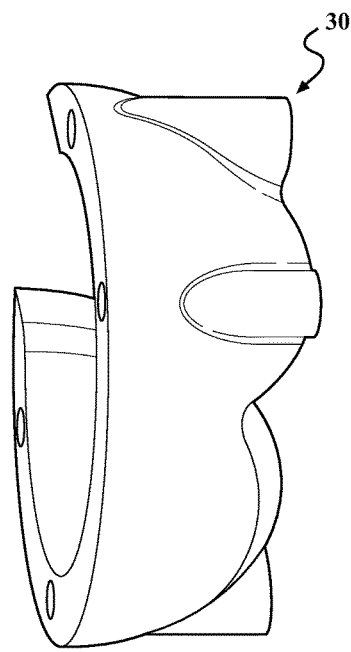
FIG. 10 is another perspective elevation view perspective elevation view of the cap.
Figure 11:
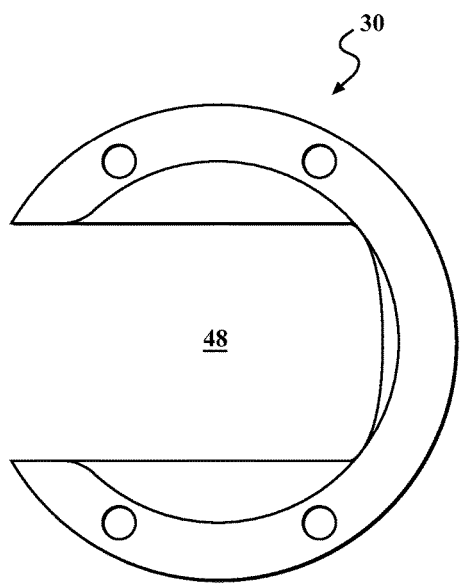
FIG. 11 is a top elevation view of the cap.

Referring to the Figures, wherein like numerals indicate corresponding parts throughout the several views, an exemplary embodiment of an improved piston and connecting rod assembly 20 constructed according to one aspect of the present invention is generally shown in FIG. 1. The piston and connecting rod assembly 20 may be configured for use with a range of different types of internal combustion engines including four stroke engines, two stroke engines, spark ignition engines, compression ignition engines and horizontally opposed piston per cylinder engines.

Referring still to FIG. 1, the assembly of the exemplary embodiment includes a piston body 22 which extends along an axis A and a connecting rod 24 which is operably joined with the piston body 22. In contrast to typical pistons and connecting rods, the exemplary piston body 22 and connecting rod 24 are joined together without a wrist or gudgeon pin. Rather, as shown in FIG. 2, the piston body 22 has a dome or semi-spherically shaped receiving surface 26 which faces away from an upper surface of the piston body 22, and an end 28 of the connecting rod 24 has a profile which matches the profile of the receiving surface 26. More specifically, the end 28 of the connecting rod 24 is generally ball-shaped to match the dome shape of the receiving surface 26. The ball shaped end 28 of the connecting rod 24 is held into engagement piston body 22 by a cap 30 which is coupled to the piston body 22 after the ball shaped end 28 of the connecting rod 24 is brought into engagement with the semi-spherically shaped receiving surface 26 of the piston body 22. The cap 30 and the dome shaped receiving surface 26 of the piston body 22 both slidably engage the ball shaped end 28 of the connecting rod 24, thereby allowing the connecting rod 24 to rotate or articulate back and forth relative to the piston body 22 during operation of the engine (not shown).

Referring back to FIG. 1, the piston body 22 includes a crown 32 and a skirt 34 which depends from the crown 32 and extends axially downwardly therefrom. In the exemplary embodiment, the skirt 34 is a full and circumferentially continuous skirt in that it extends continuously and substantially uniformly through 360° around the axis A to provide the piston body 22 with improved stability within a cylinder bore of the engine. The outer surface of the exemplary piston body 22 also includes a plurality of ring grooves 36a, 36b for receiving piston rings (not shown) for sealing the piston body 22 to a cylinder wall of the engine. Specifically, the exemplary piston body 22 includes a plurality of ring grooves 36a which surround the crown 32 and a plurality of ring grooves 36b which are disposed adjacent a bottom end of the skirt 34. In certain types of engines, the axial spacing of the ring grooves 36a on the crown 32 from the ring grooves 36b on the skirt 34 of the exemplary piston body 22 may restrict air from one or more intakes (not shown) in the cylinder wall of the engine from leaking past the piston body 22 in either axial direction during operation of the engine. However, it should be appreciated that the piston body 22 could include any desirable number of ring grooves and that the ring grooves may be located at any suitable locations on the piston body. It should also be appreciated that the skirt could alternately be open or non-circumferentially continuous, i.e., it could extend continuously through less than a 360° curve.

Referring now to FIGS. 3 and 4, the piston body 22 of the exemplary embodiment is composed of two pieces 38, 40 which are formed separately from one another (for example, through forging and/or casting operations) and are subsequently joined together. Specifically, the exemplary piston body 22 includes upper piece 38 and a lower piece 40, and these pieces 38, 40 are joined to one another through a friction welding operation or any other suitable welding operation including, for example, hybrid induction welding. In the exemplary embodiment, the upper piece 38 includes a portion of the crown 32 and has a top surface with a combustion bowl 42 formed therein, and the lower piece 40 includes the dome-shaped receiving surface 26 formed therein. Both of the pieces 38, 40 are preferably formed of steel but could alternately be formed of a range of other metals including, for example, aluminum or magnesium or various alloys thereof.

Referring now to FIG. 3, the combustion bowl 42 in the top surface of the crown 32 of the piston body 22 is formed with a circumferentially (or rotationally) asymmetrical shape around the axis A, and the dome-shaped receiving surface 26 of the piston body 22 has a generally circumferentially (or rotationally) symmetrical shape. As such, the lower piece 40 may have any desirable rotational orientation relative to the upper piece 38. This allows for manufacturing advantages because the upper and lower pieces 38, 40 do not have to be precisely rotationally oriented relative to one another, as is commonly with other known 2-piece pistons having circumferentially asymmetrically-shaped combustion bowls. Accordingly, certain manufacturing operations, such as friction welding, may be employed to join the upper and lower pieces 38, 40. Therefore, the advantages of both asymmetrically-shaped combustion bowls and friction welding are realized in the exemplary embodiment of the piston body 22.

When joined together, the upper and lower pieces 38, 40 of the exemplary embodiment cooperate with one another to provide the piston body 22 with one or more oil galleries 44 for receiving a cooling fluid to cool the piston body 22 during operation of the engine. Each of the upper and lower pieces 38, 40 has inner and outer joining surfaces which are spaced radially from one another. During the friction welding operation, the inner joining surfaces are welded together, and the outer joining surfaces are joined together. The oil galleries 44 are formed between the inner and outer joining surfaces. The piston body 22 of the exemplary embodiment is formed with a plurality of apertures which provide access for oil to be projected from the crank case into the oil galleries 44 and for oil to drain out of the oil galleries 44. These apertures could be formed, for example, during the initial formation of the lower piece 40 or they could be drilled into the lower piece 40 either before or after it is joined with the upper piece 38. It should be appreciated that the piston body 22 could alternately be formed with one or more fully enclosed oil galleries or without any oil galleries at all.

The generally dome-shaped receiving surface 26 on the exemplary piston body 22 is disposed along the axis A, and faces in the opposite axial direction as the combustion bowl 42. A plurality of supports 46 extend radially from the skirt portion of the piston body 22 to the portion of the piston body 22 with the receiving surface 26. The supports 46 are spaced circumferentially from one another to present passages between adjacent supports 46 for channeling the oil (or any other cooling fluid) into and out of the oil galleries 44 during operation of the engine. For example, in the exemplary embodiment, the piston body 22 includes six of these supports 46. The supports 46 also provide structural reinforcement to the dome-shaped receiving surface 26.

Referring now to FIGS. 8-11, the exemplary embodiment of the cap 30 is generally shown. The cap 30 includes a plurality of bolt holes for receiving bolts 48 to fasten the cap 30 with the piston body 22 to trap the end 28 of the connecting rod 24 between the dome-shaped receiving surface 26 and the cap 30. Specifically, after the upper and lower pieces 38, 40 of the piston body 22 are joined together, holes are drilled into the piston body 22 and the holes are threaded for threadedly engaging the bolts 48. An upper surface of the cap 30 is curved to slidingly engage the end 28 of the connecting rod 24.

Figure 12:
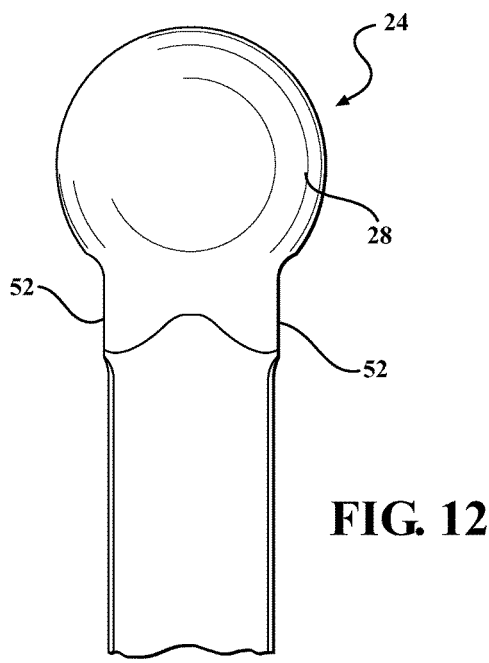
FIG. 12 is a front view of the connecting rod of the assembly of FIG. 1.
Figure 13:
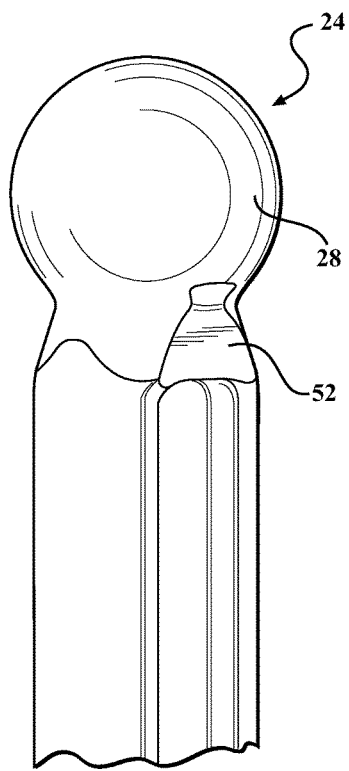
FIG. 13 is a perspective elevation view of the connecting rod.
Figure 14:
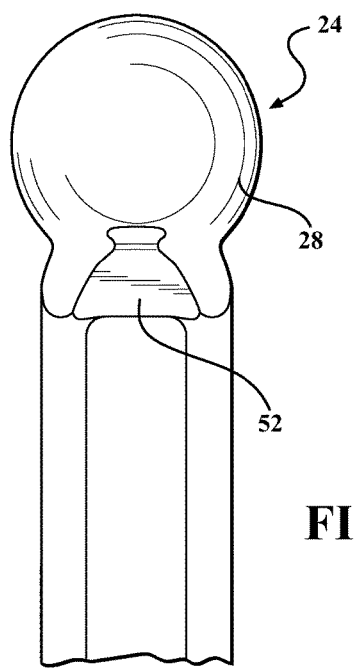
FIG. 14 is a side view of the connecting rod.
Figure 15:
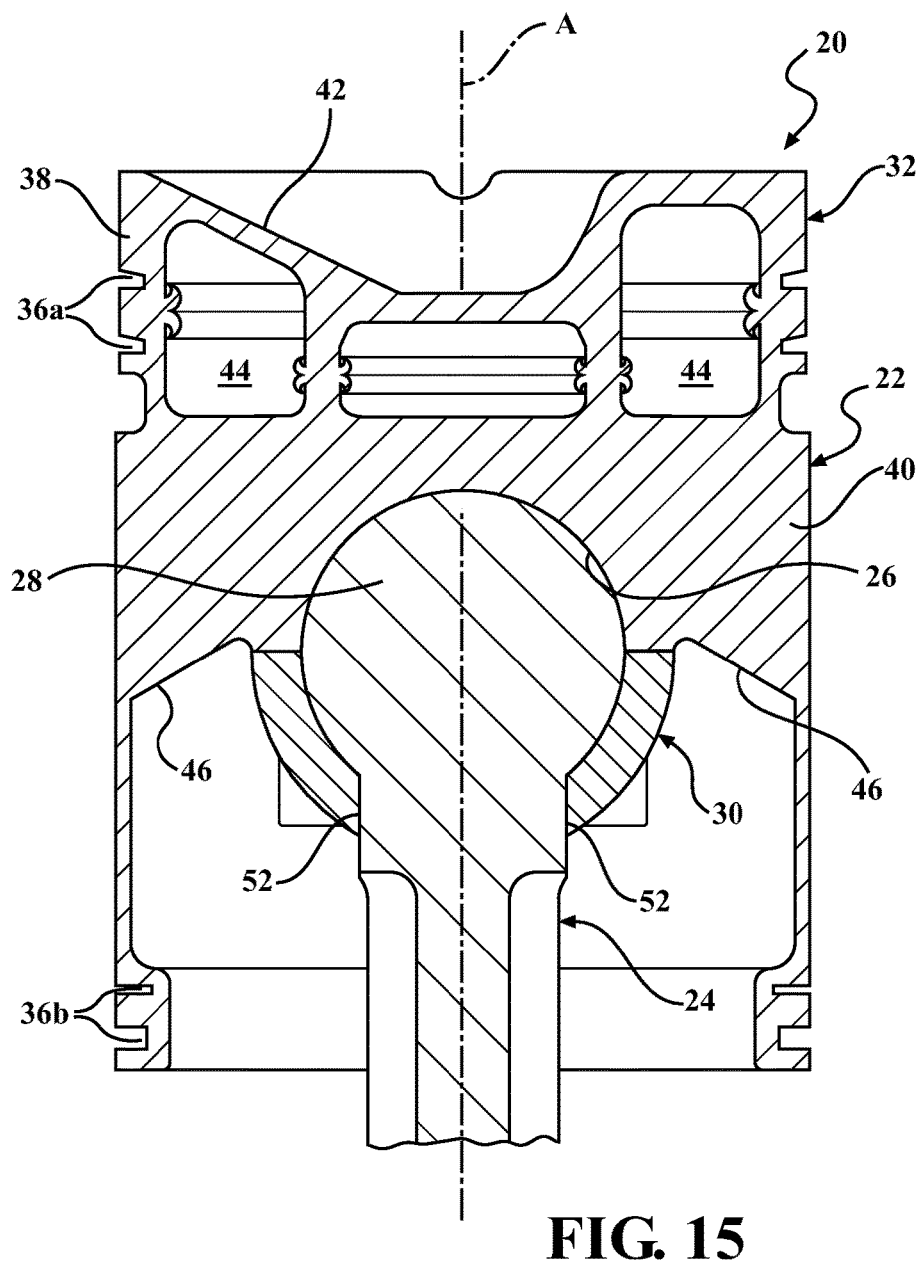
FIG. 15 is another cross-sectional view of the piston and connecting rod assembly.

The exemplary cap 30 has a generally U-shaped opening 50 extending there through, and as shown in FIGS. 12 and 13, the exemplary connecting rod 24 has a pair of opposing flat surfaces 52 adjacent its ball shaped end 28 which are spaced from one another by a distance that is similar to the width of the U-shaped opening 50 in the cap 30. When the cap 30 is coupled to the piston body 22, it at least partially straddles the portion of the connecting rod 24 with the flat surfaces 52 to restrict twisting of the piston body 22 relative to the connecting rod 24 about a vertical axis without restricting articulation of the connecting rod 24 relative to the piston body 22 during operation of the engine. The cap 30 has a plurality of bolt holes spaced from one another for receiving the bolts 48 to interconnect the cap 30 with the piston body 22.

A process or method of making a piston and connecting rod assembly 20 is also provided. The process begins with preparing an upper or first piece 38 having a combustion bowl 42 with a circumferentially asymmetrical shape about an axis A and a lower or second piece 40 with a skirt 34 having a curved or dome-shaped receiving surface 26 with a rotationally symmetrical shape about the axis A. In the exemplary embodiment, the skirt 34 has a circumferentially continuous skirt. Each of the upper and lower pieces 38, 40 has a pair of radially spaced joining surfaces, and the method continues with the step of friction welding the upper and lower pieces 38, 40 together at the pairs of joining surfaces. The exemplary method continues with the step of positioning an end 28 of a connecting rod 24 into engagement with the dome-shaped receiving surface 26 of the piston body 22. The exemplary method then proceeds with the step of joining a cap 30 with the piston body 22 while trapping the end 28 of the connecting rod 24 between the dome-shaped receiving surface 26 and the cap 30. The cap 30 may have a generally U-shaped opening 50 to allow rotation or articulation of the connecting rod 24 relative to the piston body 22 in only one rotational direction. The step of joining the cap 30 with the piston body 22 may include drilling and tapping bolt openings into the piston body 22 and bolting the cap 30 to the piston body 22.

An alternate embodiment of the piston and connecting rod assembly 120 and the various components of the assembly 120 are shown in FIGS. 16-21 with like numerals separated by a factor of 100 indicating corresponding parts with the above-described embodiment.

Figure 18:
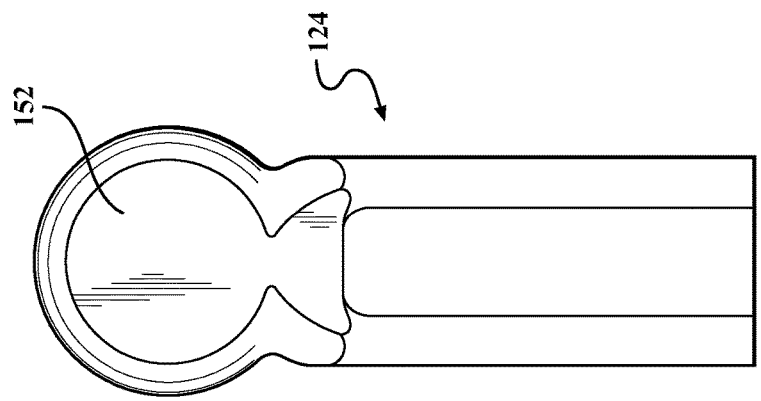
FIG. 18 is a front elevation and fragmentary view of the alternate embodiment of the connecting rod.
Figure 17:
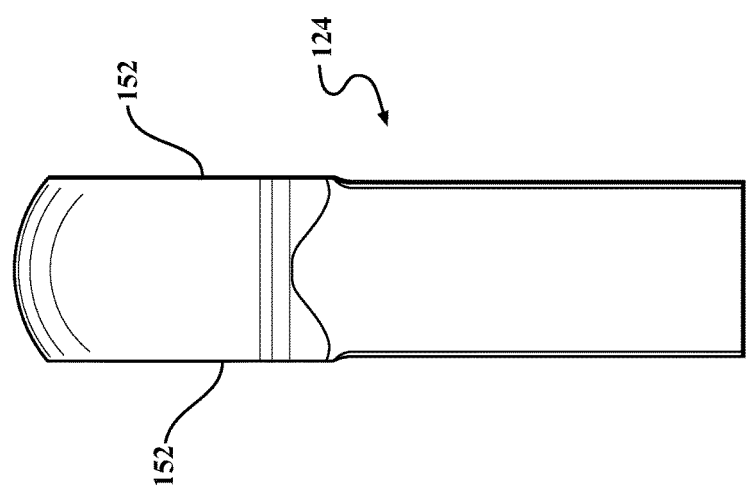
FIG. 17 is a side elevation and fragmentary view of the alternate embodiment of the connecting rod.
Figure 16:
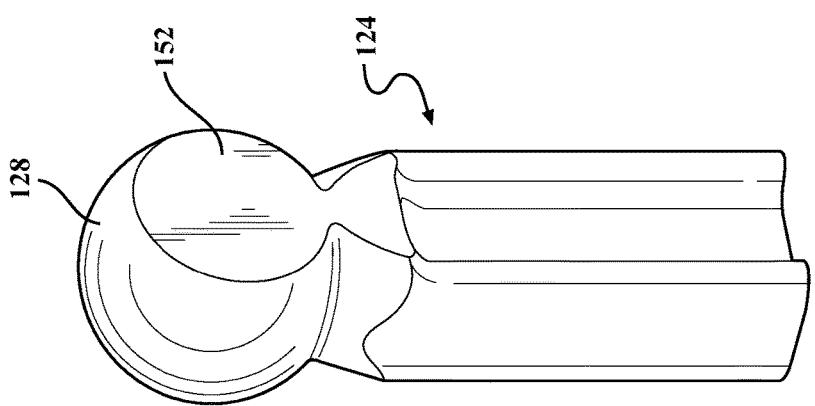
FIG. 16 is a perspective and fragmentary view of an alternate embodiment of the connecting rod.
Figure 20:
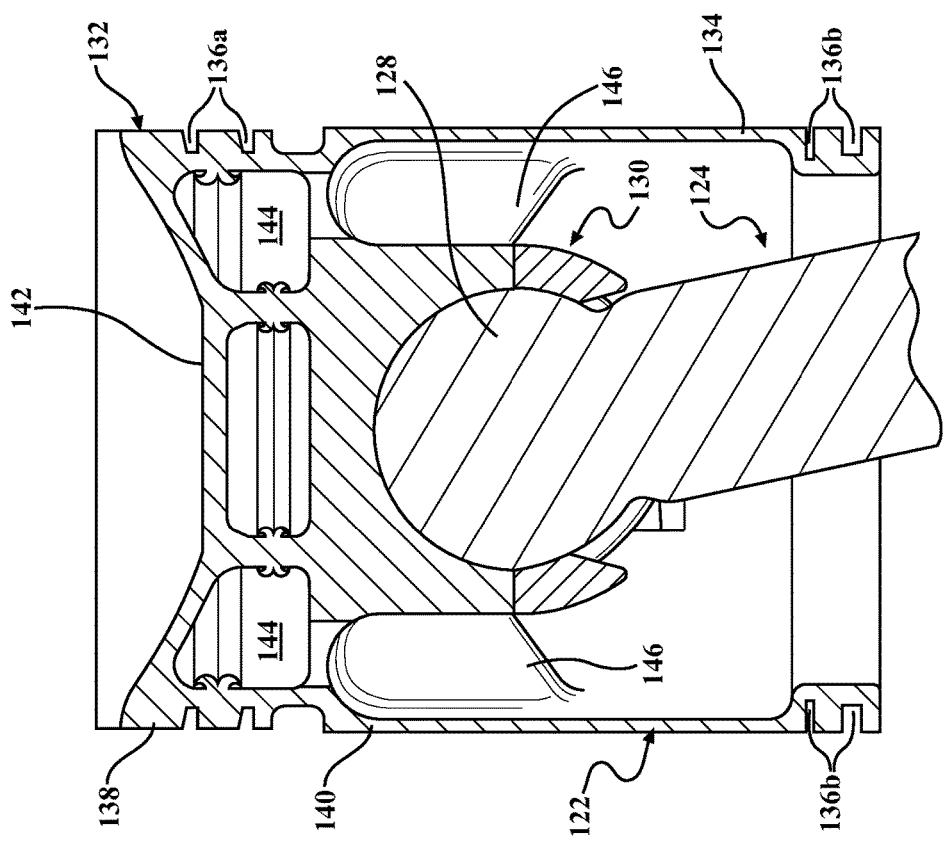
FIG. 20 is a cross-sectional and fragmentary view of an alternate embodiment of the piston and connecting rod assembly.

Referring to FIGS. 16-18, the connecting rod 124 of this alternate embodiment is distinguished from the above-discussed connecting rod 24 by the flat surfaces 152 extending upwardly onto a portion of the end 128 to give the end 128 a lollipop shape with the outer surface between the flat surfaces 152 being curved or generally semi-spherical. This particular configuration may be easier to fabricate than other designs of the connecting rod.

Figure 19:
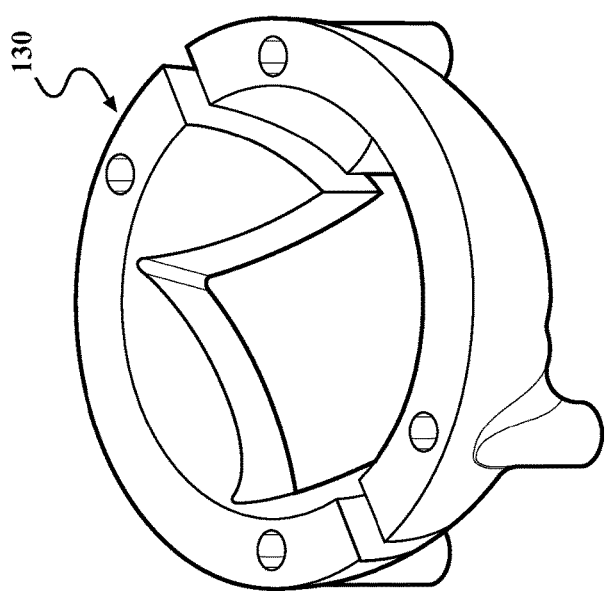
FIG. 19 is a perspective view of an alternate embodiment of the cap.
Figure 21:
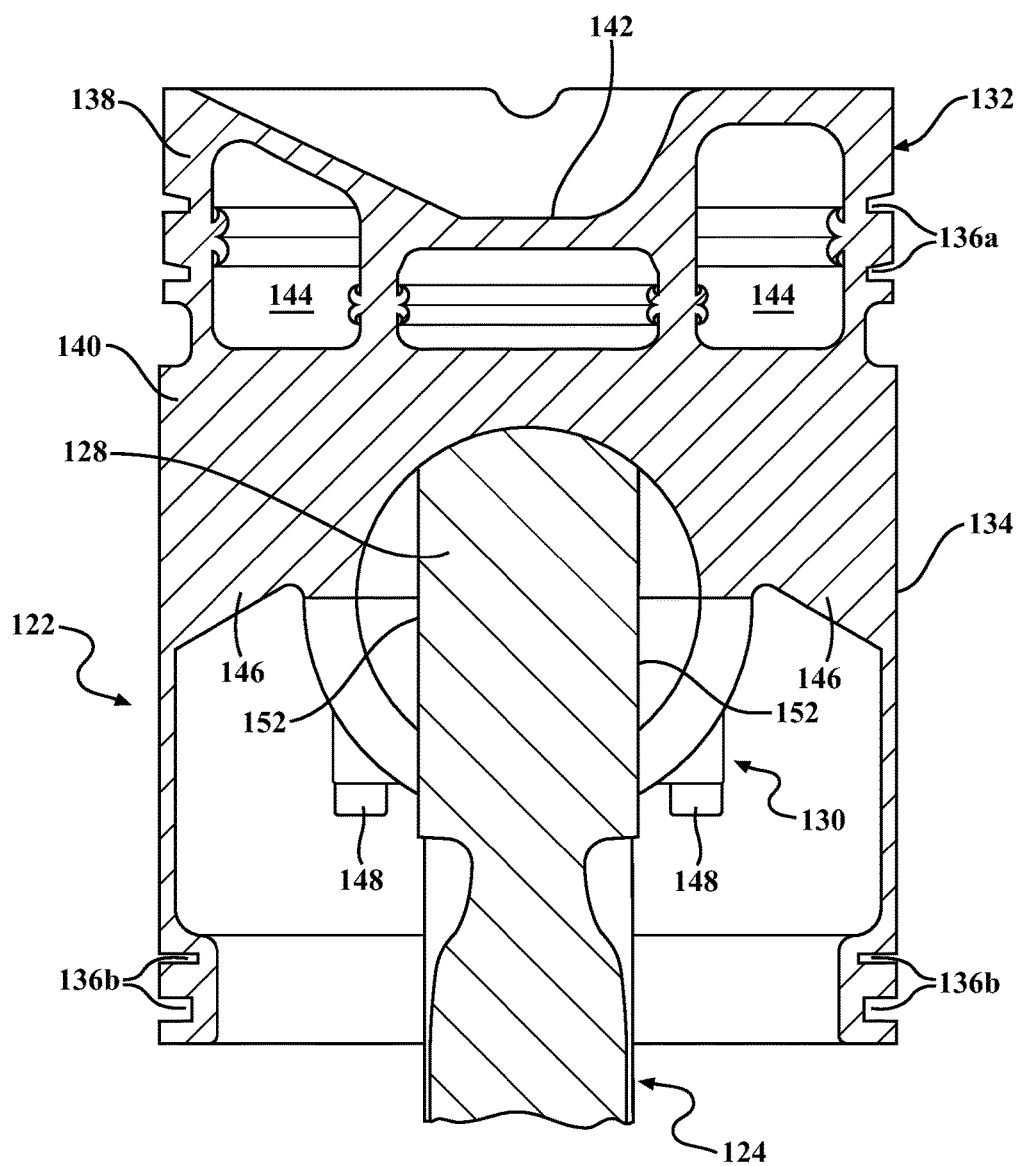
FIG. 21 is a cross-sectional and fragmentary view of the alternate embodiment of the piston and connecting rod assembly taken from a different location than FIG. 20.

Referring now to FIG. 19, the cap 130 of the alternate embodiment is composed of two pieces, and each of the pieces is notched. When the pieces are joined together, the notches face one another and together define the U-shaped opening 152. It should be appreciated that the cap 130 could be of any desirable number of pieces.

Obviously, many modifications and variations of the present invention are possible in light of the above teachings and may be practiced otherwise than as specifically described while within the scope of the appended claims.

What is claimed is:

1. A monobloc piston assembly for an internal combustion engine, comprising:
   a piston body extending along an axis, said piston body being formed of at least two pieces of material joined together by at least one weld joint which is a friction weld joint and which extends continuously through an annular shape around said axis;
   one of said pieces having an upper surface with a combustion bowl formed therein, said combustion bowl having a rotationally asymmetrical shape around said axis; and
   another of said pieces having a dome-shaped load-bearing receiving surface configured to engage and moveably support a portion of a connecting rod, and wherein said dome-shaped receiving surface is rotationally symmetrical about said axis.

2. The monobloc piston assembly as set forth in claim 1 further including a connecting rod having an end with a profile that at least partially matches a profile of said dome-shaped receiving surface of said piston body.

3. The monobloc piston assembly as set forth in claim 1 further including a cap which is joined with said piston body and captures said end of said connecting rod while allowing pivoting thereof in at least one rotational direction.

4. The monobloc piston assembly as set forth in claim 3 wherein said cap allows rotation of said connecting rod relative to said piston body in only one rotational direction.

5. The monobloc piston assembly as set forth in claim 4 wherein said cap has a generally U-shaped opening for allowing said connecting rod to rotate relative to said piston body in said only one rotational direction.

6. The monobloc piston assembly as set forth in claim 3 wherein said cap is joined with said piston body through at least one fastener.

7. The monobloc piston assembly as set forth in claim 3 wherein said end of said connecting rod is generally ball-shaped.

8. The monobloc piston assembly as set forth in claim 3 wherein said end of said connecting rod is generally lollipop shaped.

9. The monobloc piston assembly as set forth in claim 3 wherein said end of said connecting rod has a portion with a semi-spherical surface which extends between opposing flat side surfaces.

10. The monobloc piston assembly as set forth in claim 1 wherein said at least one friction weld joint is a pair of friction weld joints spaced radially from one another on opposite sides of a cooling oil gallery.

11. The monobloc piston assembly as set forth in claim 1 wherein the at least one of said first and second pieces with said dome-shaped receiving surface also has a circumferentially continuous skirt.

12. A method of making a piston, comprising the steps of:
preparing a first piece of a piston body, the first piece having a combustion bowl formed in an upper surface thereof, and the combustion bowl having a rotationally asymmetrical shape about an axis;
preparing a second piece of the piston body; and
friction welding the first and second pieces of the piston body together.

13. The method as set forth in claim 12 wherein the second piece has a dome-shaped receiving surface with a rotationally symmetrical shape before the step of welding the first and second pieces of the piston body together.

14. The method as set forth in claim 12 wherein the second piece has a circumferentially continuous skirt.

15. The method as set forth 12 wherein each of the first and second pieces has a pair of joining surfaces spaced radially from one another and wherein the step of friction welding the first and second pieces together includes friction welding the pieces together at the pairs of joining surfaces.

16. The method as set forth in claim 12 further including the step of positioning an end of a connecting rods into engagement with the dome-shaped receiving surface of the piston body, wherein the end of the connecting rod has a profile that at least partially matches a profile of the dome-shaped receiving surface to allow rotation of the connecting rod relative to the piston body.

17. The method as set forth in claim 16 further including the step of joining a cap with the piston body while trapping the end of the connecting rod between the cap and the dome-shaped receiving surface on the piston body.

18. The method as set forth in claim 17 wherein the cap has a generally U-shaped opening to allow rotation of the connecting rod relative to the piston body in only one rotational direction.

19. A monobloc piston for an internal combustion engine, comprising:
a piston body having at least two pieces joined by a friction weld joint to define at least one cavity there between and extending along a piston axis;
one of said pieces having an upper surface with a combustion bowl having asymmetrical shape around said piston axis;
one of said pieces having an upper surface with a combustion bowl having asymmetrical shape around said piston axis;
another of said pieces having a part-spherical load bearing surface for engaging and moveably supporting a connecting rod; and
said piston being free of laterally spaced pin bosses having pin bores aligned along a pin bore axis transverse to said piston axis.

\* \* \* \* \*